US006340926B1

(12) United States Patent
Chu

(10) Patent No.: US 6,340,926 B1
(45) Date of Patent: Jan. 22, 2002

(54) POWER PLUG WITH CIRCUIT BREAKER

(75) Inventor: Raymond Wai Hang Chu, Chai Wan (HK)

(73) Assignee: Defond Manufacturing Limited, Chai Wan (HK)

( * ) Notice: Subject to any disclaimer, the term of this patent is extended or adjusted under 35 U.S.C. 154(b) by 0 days.

(21) Appl. No.: 09/469,366

(22) Filed: Dec. 22, 1999

(51) Int. Cl.[7] .......................... H01H 37/76; H02H 5/04

(52) U.S. Cl. ...................... 337/407; 337/412; 337/416; 361/104

(58) Field of Search ................................ 337/141, 158, 337/166, 227, 296, 291, 297, 401–407, 412, 414; 361/9.3, 103–106, 241, 115

(56) References Cited

U.S. PATENT DOCUMENTS

| | | | | | |
|---|---|---|---|---|---|
| 3,585,555 | A | * | 6/1971 | Yamada | 337/187 |
| 4,345,223 | A | * | 8/1982 | Chien-Chun | 335/6 |
| 4,484,185 | A | * | 11/1984 | Graves | 340/656 |
| 4,514,715 | A | * | 4/1985 | Chen | 337/113 |
| 4,823,225 | A | * | 4/1989 | Foster et al. | 361/42 |
| 5,176,539 | A | * | 1/1993 | Liu | 439/622 |
| 5,198,955 | A | * | 3/1993 | Willner | 361/42 |
| 5,590,010 | A | * | 12/1996 | Ceola et al. | 361/93 |
| 5,644,464 | A | * | 7/1997 | Zhou | 361/115 |
| 5,661,623 | A | * | 8/1997 | McDonald et al. | 361/42 |
| 5,930,097 | A | * | 7/1999 | Ceola et al. | 361/103 |
| 6,204,747 | B1 | * | 3/2001 | Kitchens | 337/407 |

FOREIGN PATENT DOCUMENTS

| | | | | | |
|---|---|---|---|---|---|
| GB | 2177544 | A | * | 1/1987 | H01H/9/22 |
| GB | 2204192 | A | * | 11/1988 | H01R/13/713 |
| GB | 2231215 | A | * | 7/1990 | H02H/3/33 |
| JP | 8-223783 | A | * | 2/1995 | H02H/5/00 |
| JP | 7-105823 | A | * | 4/1995 | H01H/83/02 |

* cited by examiner

*Primary Examiner*—Leo P. Picard
*Assistant Examiner*—Anatoly Vortman
(74) *Attorney, Agent, or Firm*—Leydig, Voit, & Mayer, Ltd.

(57) ABSTRACT

A power plug includes a plug body having opposite sides and an end, terminal prongs extending from the end of the plug body, and a built-in circuit breaker. The circuit breaker is operable between a normal condition enabling the power plug to connect a load to a power source and a tripped condition disconnecting the load upon the detection of a circuit fault. The circuit breaker includes at least two members at respective opposite sides of the plug body which are simultaneously movable between a first position corresponding to the normal condition and a second position corresponding to the tripped condition. The members provide an indication of the operating condition of the circuit breaker viewable on both sides of the plug body.

7 Claims, 4 Drawing Sheets

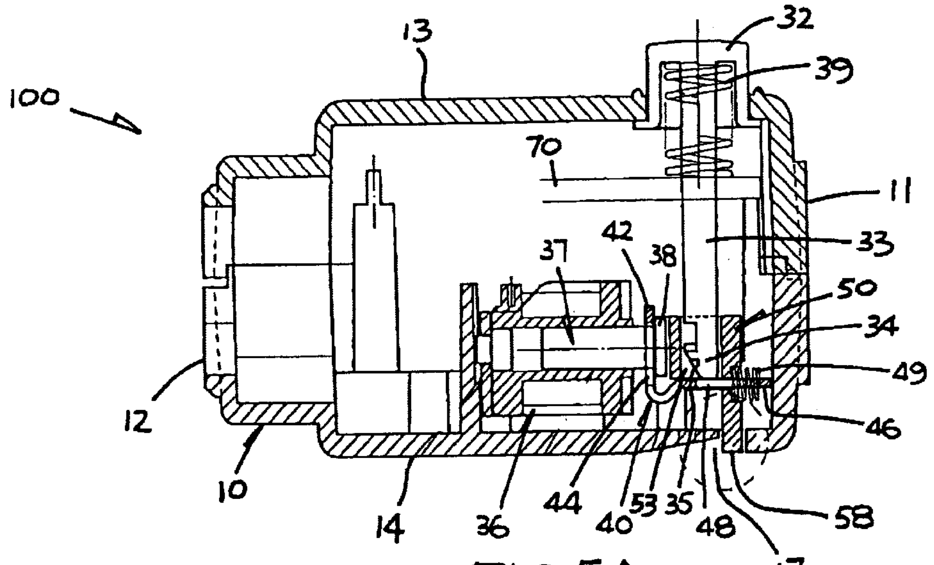
FIG.5A
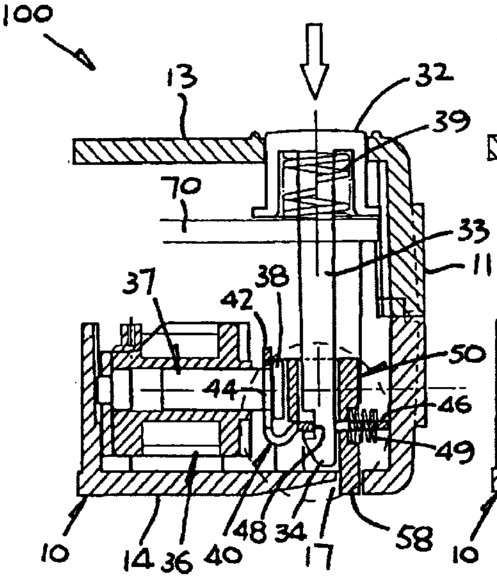
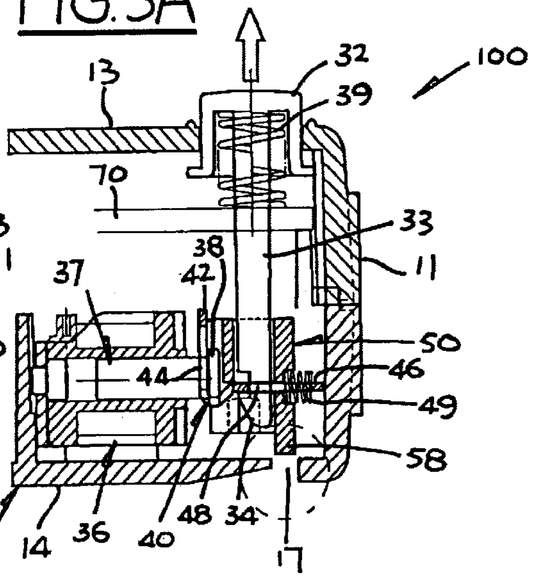
FIG.5B
FIG.5C
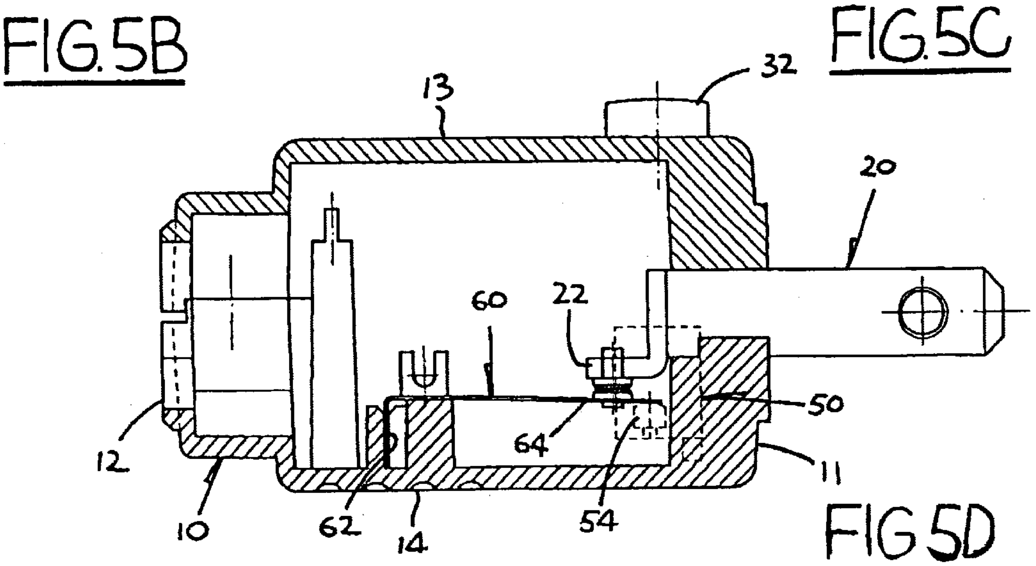
FIG 5D

POWER PLUG WITH CIRCUIT BREAKER

The present invention relates to a power plug incorporating a built-in circuit breaker.

BACKGROUND OF THE INVENTION

Power plugs incorporating a built-in circuit breaker are generally known, in that the circuit breaker has a reset button for, after the clearance of a circuit fault, resetting the circuit breaker back to the normal switched-on condition. The reset button is usually provided on one side of the power plug and its relative position (raised or lowered) indicates the operating condition of the circuit breaker.

The invention introduces an improved power plug of this type, which can provide a more noticeable indication of the circuit breaker condition.

SUMMARY OF THE INVENTION

According to the invention, there is provided a power plug comprising a body having opposite sides and an end, a plurality of terminal prongs extending from the end of the plug body, and a built-in circuit breaker operable between a normal condition enabling the power plug to connect a load to a mains power source and a tripped condition disconnecting the load upon the detection of a circuit fault, said circuit breaker including at least two members provided at the opposite sides of the plug body respectively, which members are simultaneously movable between a first position corresponding to the said normal condition and a second position corresponding to the said tripped condition, thereby providing an indication of the operating condition of the circuit breaker on either side of the plug body irrespective of the position of the plug body in use.

In a first preferred embodiment, one of the members is movable between a lowered position on the plug body corresponding to the said normal condition and a raised position corresponding to the said tripped condition More preferably, said one member is a reset button for resetting the circuit breaker to the normal condition.

In a second preferred embodiment, one of the members is movable between a hidden position within the plug body corresponding to the said normal condition and an exposed position corresponding to the said tripped condition.

More preferably, the corresponding side of the plug body is formed with a recessed opening for exposing a lateral side of said one member extending into it from inside the plug body.

It is preferred that the circuit breaker includes at least one resiliently biassed movable contact for contacting one of the terminal prongs in the said normal condition and an actuator for moving the contact into contact with the terminal prong, and said one member is movable by the actuator.

More preferably, said one member is provided by a part fixed to the actuator.

Further more preferably, said one member is provided by an integral part of the actuator.

Advantageously, said one member is of a distinctive color.

In the second preferred embodiment, the other member is movable between a lowered position on the plug body corresponding to the said normal condition and a raised position corresponding to the said tripped condition.

More preferably, the two members are movable in opposite directions.

BRIEF DESCRIPTION OF DRAWINGS

The invention will now be more particularly described, by way of example only, with reference to the accompanying drawings in which:

FIGS. 5A to 5D are cross-sectional side views of the power plug of FIG. 1, illustrating the operation of the circuit breaker components and related parts of FIGS. 3 and 4.

DETAILED DESCRIPTION OF PREFERRED EMBODIMENT

Figure 1:
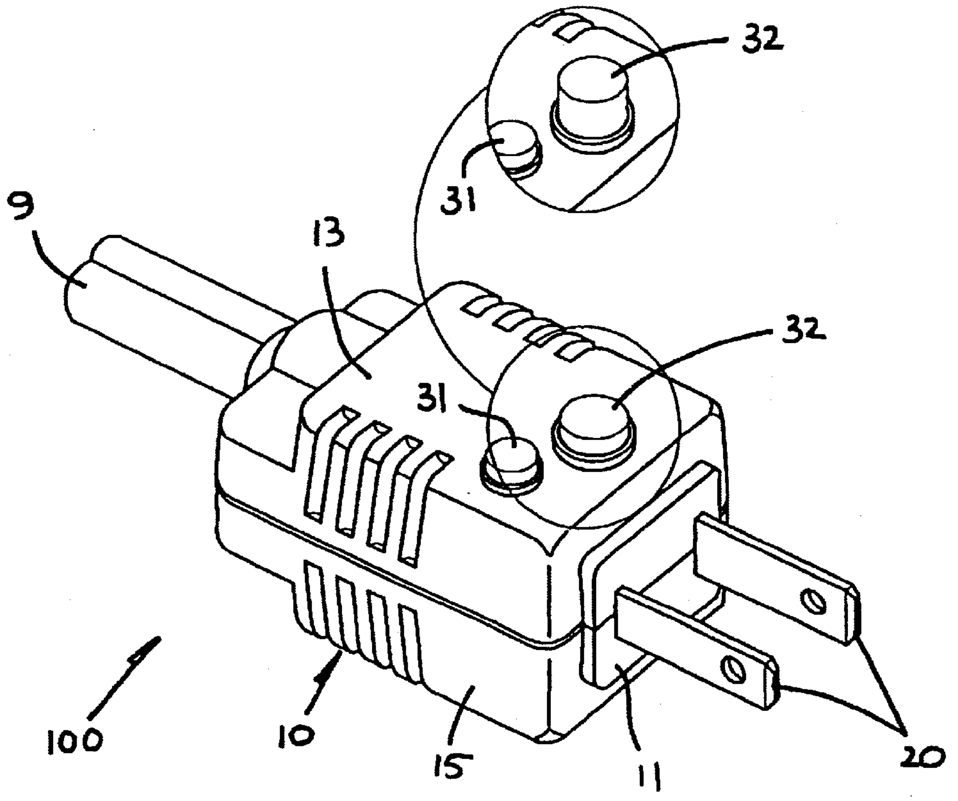
FIG. 1 is a top perspective view of an embodiment of a power plug in accordance with the invention.
Figure 2:
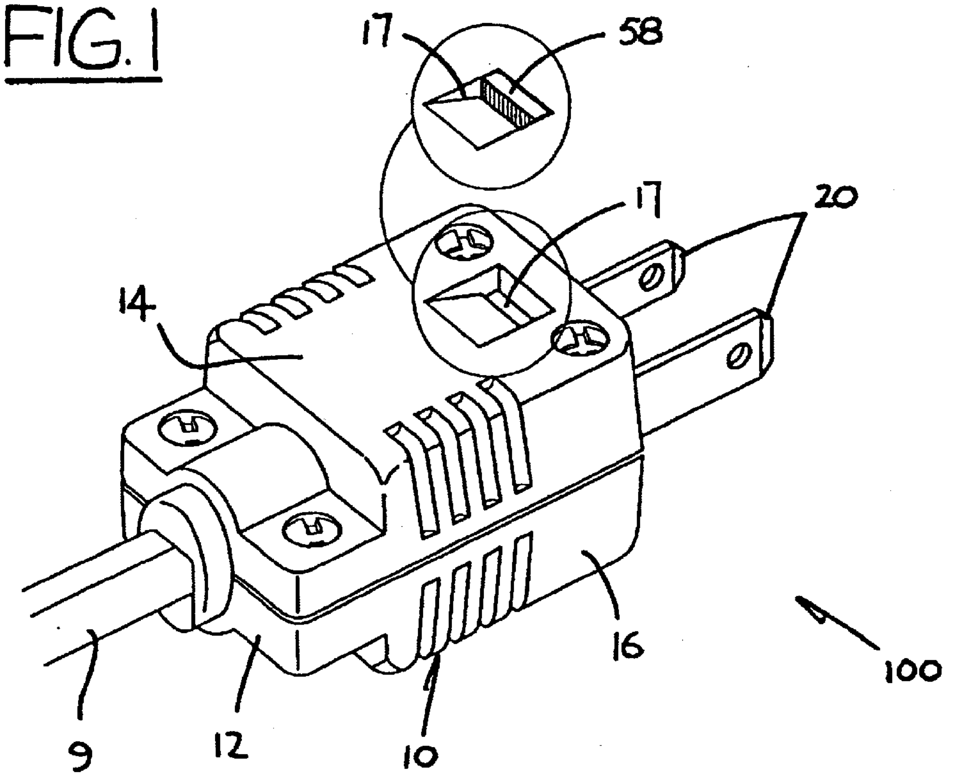
FIG. 2 is a bottom perspective view of the power plug of FIG. 1.
Figure 3:
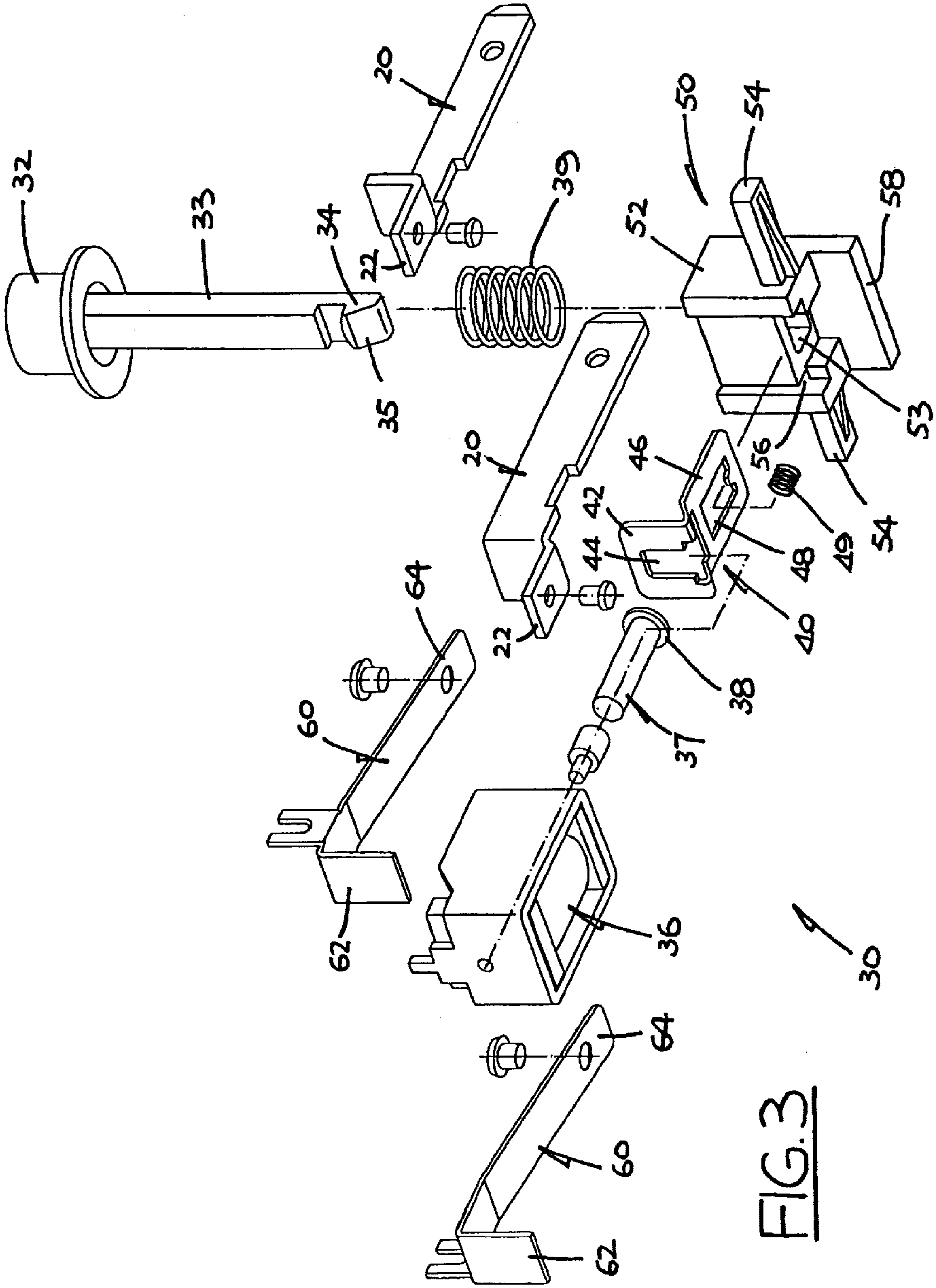
FIG. 3 is an exploded perspective view showing the components of a built-in circuit breaker and related parts of the power plug of FIG. 1.
Figure 4:
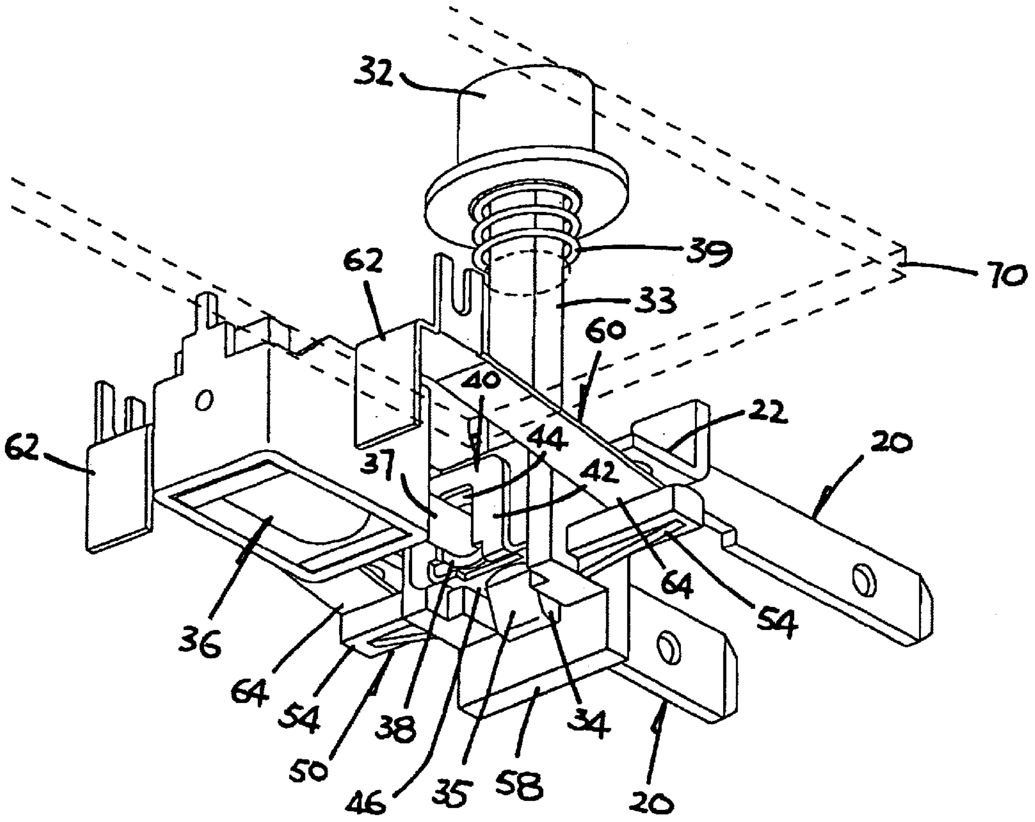
FIG. 4 is a perspective view showing the circuit breaker components and related parts of FIG. 3, showing how they are assembled together.

Referring initially to FIGS. 1 to 5D of the drawings, there is shown a power plug 100 embodying the invention, which power plug 100 has a generally rectangular box-like body 10 and a pair of live and neutral terminal prongs 20 extending out from a front end 11 of the body 10. The plug body 10 includes a rear end 12 for the entrance of a power cable 9 connected to a load, top and bottom sides 13 and 14, and left and right sides 15 and 16 for gripping. The power plug 100 incorporates a built-in circuit breaker 30 which has a test button 31 and a reset button 32 both provided on the body top side 13. The body bottom side 14 is formed with a recessed slot opening 17 at a position corresponding to that of the reset button 32 on opposite side.

The circuit breaker 30 incorporates an electronic operating circuit (not shown) provided on a circuit board 70 for, inter alia, detecting the occurrence of a circuit fault, such as an earth leakage of over-current, in the load circuit. The circuit breaker 30 further includes a solenoid 36 controlled by the operating circuit, an L-shaped slider 40 movable by a spring-loaded plunger 37 of the solenoid 36, an actuator 50 co-operable with the slider 40, and a pair of resilient contact levers 60 provided on opposite sides of these components which are aligned along a horizontal central axis of the plug body 10.

The levers 60 have respective rear ends 62 which are fixed and connected to the corresponding cores of the power cable 9 and respective front ends 64 which are resiliently pivotable upwards and downwards. Rear ends 22 of the terminal prongs 20 are positioned directly above the front ends 64 of the respective levers 60, for contact by them to complete the circuit between the terminal prongs 20 and the power cable 9 via the levers 60.

The slider 40 has a vertical panel 42 which is formed with a vertical slot 44 in engagement with a free end 38 of the plunger 37, and includes a horizontal panel 46 which is formed with a horizontal slot 48.

The actuator 50 has a body 52 which has a vertical hollow passage 53 of a rectangular cross-section and includes a pair of horizontal integral arms 54 on opposite outer sides in engagement from below with and for pivoting the front ends 64 of the respective levers 60 upwards to come into contact with the rear ends 22 of the corresponding terminal prongs 20. In reaction, the actuator 50 is resiliently biased by the levers 60 to move downwards.

The actuator body 52 is formed with a horizontal gap 56, right below the lower end of the passage 53, for slidably receiving the horizontal panel 46 of the slider 40 such that the actuator 50 and slider 40 are inter-engaged for simultaneous vertical movement. The slot 48 of the panel 46 is generally aligned with the lower end of the passage 53. Lowermost end 58 of the actuator body 52 is planar and in vertical alignment with the opening 17 on the bottom side 14 of the plug body 10, for extending outwards through the opening 17. The actuator 52 or in particular its lowermost end 58 is of a distinctive color, such as red, which is different from the color of the plug body 10.

The reset button 32 has a vertical shaft 33 of a rectangular cross-section, which extends downwards through the circuit board 70 and then the passage 53 for co-operation with the actuator 50 and also the slider 40. The lowermost end of the shaft 33 is in the form of a side hook 34 facing the solenoid plunger 37 and including an inclined outer surface 35 for latching engagement with the horizontal panel 46 of the slider 40 through the slot 48.

The slider panel 46 passes completely through the gap 56 and extends out on the opposite side of the actuator body 52. A compression coil spring 49 is used within the exposed end of the slot 48 to resiliently bias the panel 46 further outwards for two actions. The first action is to resiliently bias the opposite end of the slot 48 into latching engagement with the hook 34. The second action is to, in turn via the other panel 42 of the slider 40, resiliently bias the plunger 37 to extend outwards from the coil of the solenoid 36.

Another, relatively larger, compression coil spring is disposed on the shaft 33, which co-acts between the reset button 32 and the circuit board 70 for resiliently biasing the reset button 33 upwards. The latching engagement between the hook 34 and the slider panel 46 will keep the reset button 32 downwards against the action of the spring 39.

The circuit breaker 30 may be in either one of the following operating conditions: (1) a normal condition enabling the power plug 100 to connect the load to the mains power source and (2) a tripped condition disconnecting the load upon the detection of a circuit fault by the operating circuit.

In the normal condition (FIG. 5C), the solenoid 36 is not energised to have its plunger 37 free to extend outwards, which permits the spring 49 to perform the aforesaid two actions. The latching of the reset button hook 34 with the slider panel 46 results in vertical engagement of the actuator 50 with the reset button 32 (via the shaft 33). The spring 39 moves the reset button 32 upwards (to a limited extent) into a normal or lower/lowered position and also moves the actuator 50 upwards causing the levers 60 to come into contact with the corresponding terminal prongs 20 (FIG. 5D). In the upward position, the lowermost end 58 of the actuator 50 stays off the opening 17 and is hidden within the plug body 10.

The reset button 32 being lowered and the actuator end 58 being invisible provide two indications on opposite top and bottom sides 13 and 14 of the plug body 10 that the circuit breaker 30 is in the normal condition (FIG. 5C).

Upon the detection of a circuit fault, the solenoid 36 is energised to retract its plunger 37 inwards against the action of the spring 49, thereby causing the plunger 37 to withdraw the slider 40 from the actuator 50. This results in disengagement of the slider panel 46 from the reset button hook 34, which in turn releases the vertical engagement between the actuator 50 and the reset button 32. Consequently, the spring 39 will move the reset button 32 further upwards into a raised position. Also, the levers 60 will flex, by virtue of their resilient nature, downwards off the corresponding terminal prongs 20, thereby cutting off the mains power previously supplied to the load and circuit breaker 30, and at the same time moving the actuator 50 downwards, Downward movement of the actuator 50 causes its lowermost end 58 to extend outwards through the opening 17 and have the lateral side of its extreme end exposed in the recess of the opening 17 (see FIG. 2).

The reset button 32 being raised and the actuator end 58 being visible provide two indications on opposite top and bottom sides 13 and 14 of the plug body 10 that the circuit breaker 30 in the tripped condition (FIG. 5A).

After the circuit fault has been cleared, depression of the reset button 32 will return the circuit breaker 30 back to the normal condition. When the reset button 32 is initially depressed fully downwards against the action of the spring 39, its hook 34 will re-engage with the slider panel 46 (FIG. 5B) by reason of its inclined surface 35 through a latch action enabled by the spring 49. This results in vertical engagement of the actuator 50 with the reset button 32. Upon release, the reset button 32 will be moved upwards by the spring 39 into the lowered position (FIG. 5C). The actuator 50 will simultaneously moved upwards by the spring 39 to pivot the levers 60 into contact with the corresponding terminal prongs 20 (FIG. 5D) and to withdraw its lowermost end 58 from sight.

The reset button 32 and the actuator end 58 provide, on opposite top and bottom sides 13 and 14 of the plug body 10, duplicate indication of the operating condition of the circuit breaker 30. In practice, irrespective of the position (whether normal or upside-down) the power plug 100 is inserted into a mains power socket on the wall, and/or the orientation of the power socket fixed on the wall, the circuit breaker condition could easily or conveniently be determined by a person by looking at either indication.

Figure 6:
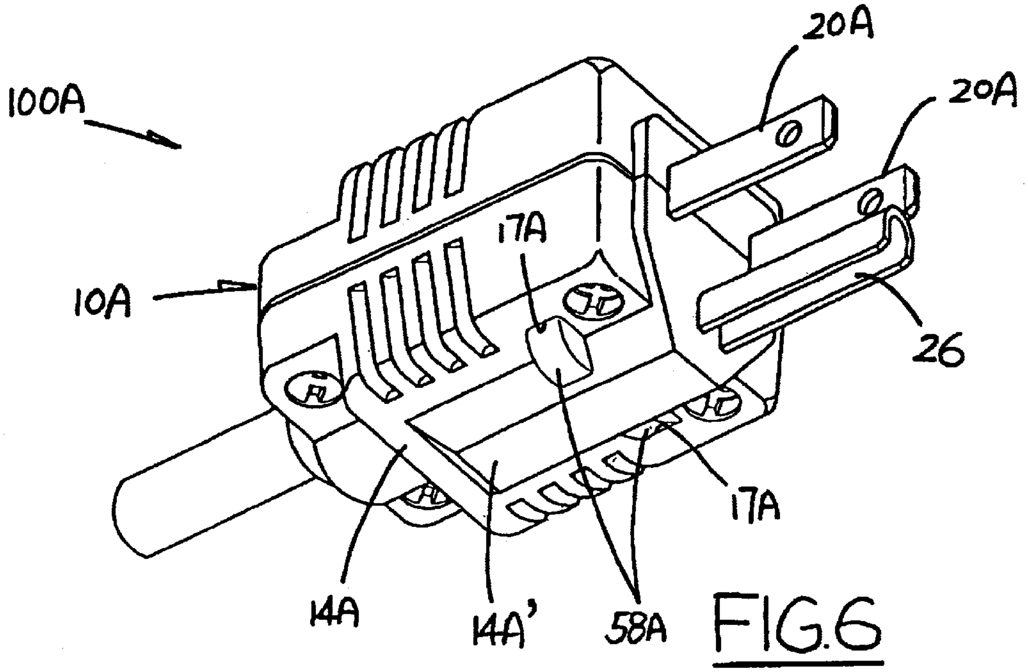
FIG. 6 is a bottom perspective view of another embodiment of a power plug in accordance with the invention.

Referring now to FIG. 6 of the drawings, there is shown another power plug 10A embodying the invention, which has the same general construction as the earlier power plug 100, with like parts designated by like reference numerals suffixed by letter "A", and operates in essentially the same way.

The present power plug 100A has two major differences. First, there is a third, earth terminal prong 26 in addition to the live and neutral prongs 20A, which necessitates the formation of a central ridge 14A' (extra space) on the bottom side 14A of the plug body 10A. Second, the internal actuator (not shown but equivalent to the earlier actuator 50) has a pair of lowermost ends 58A which are extendable in and out through respective holes 17A formed in the bottom side 14A on opposite sides of the ridge 14A'. Apart from these two ends 58A, the present actuator is constructed and works in the same manner.

In operation, the actuator is movable downwards to protrude its ends 58A out from the bottom side 14A (raised position) for indicating the tripped condition of the built-in circuit breaker and movable upwards to retract its ends 58A into the plug body 10A (hidden position or lowered position if desired) for indicating the normal condition. Two ends 58A are employed to ensure that at least one of them will not be blocked from sight by the ridge 14A'.

The two actuator ends 58A and the reset button (not shown but equivalent to the earlier reset button 32) provide, on opposite top and bottom sides of the plug body 10A, duplicate indication of the operating condition of the built-in circuit breaker for easy/convenient viewing by a person irrespective of the position/orientation of the power plug 100A and/or wall socket.

The invention has been given by way of example only, and various other modifications of and/or alterations to the described embodiment may be made by persons skilled in the art without departing from the scope of the invention as specified in the appended claims.

What is claimed is:

1. A power plug comprising:

a plug body having opposite sides and an end, a plurality of terminal prongs extending from the end of the plug body, and a built-in circuit breaker operable between a normal condition enabling the power plug to connect a load to a power source and a tripped condition disconnecting the load upon the detection of a circuit fault, the circuit breaker including first and second members located at opposite sides of the plug body, simultaneously moved from a first position, corresponding to the normal condition, to a second position, corresponding to the tripped condition, thereby providing an indication of the normal or tripped condition of the circuit breaker viewable on both sides of the plug body wherein the first member is a reset button for resetting the circuit breaker to the normal condition at a lowered position on the plug body, the reset button having a raised position protruding from the plug body and corresponding to the tripped condition.

2. The power plug as claim in claim 1, including at least one resiliently biassed movable contact for contacting a first of the terminal prongs in the normal condition and an actuator for moving the contact into contact with the first terminal prong, and wherein the first member is moved by the actuator.

3. The power plug as claimed in claim 2, wherein the first member is fixed to the actuator.

4. The power plug as claimed in claim 3, wherein the first member is an integral part of the actuator.

5. A power plug comprising:

a plug body having opposite sides and an end, a plurality of terminal prongs extending from the end of the plug body, and a built-in circuit breaker operable between a normal condition enabling the power plug to connect a load to a power source and a tripped condition disconnecting the load upon the detection of a circuit fault, the circuit breaker including first and second members located at opposite sides of the plug body, simultaneously moved from a first position, corresponding to the normal condition, to a second position, corresponding to the tripped condition, thereby providing an indication of the normal or tripped condition of the circuit breaker viewable on both sides of the plug body, wherein the first member is movable between a hidden position within the plug body corresponding to the normal condition and an exposed position corresponding to the tripped condition, and at least one resiliently biassed movable contact for contacting a first of the terminal prongs in the normal condition and an actuator for moving the movable contact into contact with the first terminal prong, wherein the first member is moved by the actuator.

6. The power plug as claimed in claim 5, wherein the first member is fixed to the actuator.

7. The power plug as claimed in claim 6, wherein the first member is an integral part of the actuator.

* * * * *